(12) United States Patent
Lindeman et al.

(10) Patent No.: US 7,549,040 B2
(45) Date of Patent: Jun. 16, 2009

(54) METHOD AND SYSTEM FOR CACHING PERIPHERAL COMPONENT INTERCONNECT DEVICE EXPANSION READ ONLY MEMORY DATA

(75) Inventors: James Arthur Lindeman, Austin, TX (US); Muhamed Sadic, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 11/379,289

(22) Filed: Apr. 19, 2006

(65) Prior Publication Data

US 2007/0250690 A1 Oct. 25, 2007

(51) Int. Cl.
*G06F 9/00* (2006.01)

(52) U.S. Cl. .................. 713/1; 713/187; 711/102

(58) Field of Classification Search .......... 713/1, 713/187; 711/102
See application file for complete search history.

(56) References Cited

U.S. PATENT DOCUMENTS

| | | | |
|---|---|---|---|
| 5,608,876 A * | 3/1997 | Cohen et al. ............... 710/300 |
| 5,854,905 A | 12/1998 | Garney | |
| 5,889,959 A * | 3/1999 | Whittaker et al. ........... 709/232 |
| 6,529,989 B1 | 3/2003 | Bashford et al. | |
| 2003/0023812 A1* | 1/2003 | Nalawadi et al. ............ 711/118 |
| 2003/0051114 A1 | 3/2003 | Natu | |
| 2003/0069999 A1* | 4/2003 | Cheston et al. ............. 709/316 |
| 2003/0236970 A1* | 12/2003 | Palmer et al. .................. 713/1 |
| 2004/0153600 A1* | 8/2004 | Rydman ..................... 711/102 |
| 2004/0193738 A1* | 9/2004 | Natu et al. ...................... 710/1 |
| 2005/0038986 A1 | 2/2005 | Agan et al. | |
| 2005/0268029 A1* | 12/2005 | Wen et al. ................... 711/112 |
| 2005/0289288 A1* | 12/2005 | Matheny et al. ............. 711/102 |

* cited by examiner

*Primary Examiner*—Thomas Lee
*Assistant Examiner*—Vincent T Tran
(74) *Attorney, Agent, or Firm*—Yee & Associates, P.C.; Libby Z. Handelsman (57) ABSTRACT

A system for caching peripheral component interconnect device data. In response to probing a peripheral component interconnect device, peripheral component interconnect device data is discovered. The discovered peripheral component interconnect device data is cached and then configured to enable the peripheral component interconnect device to execute.

9 Claims, 5 Drawing Sheets

```
: PROBE-FCODE ( slot-id - found-FCode? )
  { _slot-id ; _pnode_rombase_Imagebase_pcir_pcir-len_found-FC? }

0 -> _found-FC? \ Haven't loaded FCode yet
  h# E152 checkpoint \ Probe for adapter FCODE, evaluate if present _slot-id init-rombar ( rombase ) -> _rombase
  _rombase -> _imagebase _rombase if
    dbg-bitmask @ F[ DBG-DUMP-ADAPTER-VPD Fliteral1 F] and if
      \ Easy way for mfg to see if the FCode & VPD is programmed right
      \ Is to just dump all from the debug menu option
      _rombase dump-adapter-vpd
    then
  then begin
    _imagebase dup lf 2c@-le h# AA55 = then while \ valid ROM image?

_imagebase dup h# 18 + 2c@-le + -> _pcir
    _pcir h# 10 + 2c@-le 9 << -> _pcir-len
    _pcir 4c@-le h# 52494350 = if  \ must match "PCIR"
      _pcir _slot-id adapter-fcode-match? if
        _imagebase _rombase - encode-Int " fcode-rom-offset" property
        _imagebase collect-fcode ( success? ) if
          eval-fcode \ now run it
          ( eval-success? ) dup -> _found-FC?
          ( eval-success? ) 0= if
            \ if we encountered errors while interpreting the FCode,
            \ mark the cached FCode as invalid
            fcode-buff h# 100 erase
          then
        then
        0 -> _imagebase
      else  \ this isn't a match, look at next one
        _pcir h# 15 + c@ h# 80 and if
          0 -> _imagebase
        else
          _imagebase _pcir-len + -> _imagebase
        then
      then
    else                 \ not a valid PCI header
      0-> _imagebase
    then
  repeat
```

FROM FIG. 5A

```
\ Now if we didn't find any FCode above, see if we can use the last
\ cached copy. This is used for Concho (2x Duval w/ single FCode)
_found-FC? 0= if
    fcode-buff dup h# 18 + 2c@-le + -> _pcir
    _pcir _slot-id adapter-fcode-match?
    _pcir 4+2c@-le ( vendor-id )
    _pcir 6+2c@-le
    ( vendor-id device-id ) fcode-cache-supported?
    ( adapter-fcode-match? fcode-cache-supported? ) and if
        0 0 " ibm,fw-cached-fcode" property
        eval-fcode
        ( eval-success? ) -> _found-FC?
    then
then _slot-id_rombase close-rombar h# E153 checkpoint \ End adapter FCODE probe/evaluation \ begdoc:
\ fwchkpnt:    E153;
\ desc:    End adapter FCODE,
\         probe/evaluate;
\ repair:   See the note on 'Problem not resolved' procedure;
\ enddoc:

_found-FC?
 ;
```

METHOD AND SYSTEM FOR CACHING PERIPHERAL COMPONENT INTERCONNECT DEVICE EXPANSION READ ONLY MEMORY DATA

BACKGROUND OF THE INVENTION

1. Field of the Invention

The present invention relates generally to an improved data processing system. More specifically, the present invention is directed to a computer implemented method, apparatus, and computer useable program code for caching peripheral component interconnect device expansion read only memory data in basic input output system memory.

2. Description of the Related Art

Computer systems generally include hardware resources, including but not limited to one or more central processing units, such as microprocessors, and one or more memory devices, such as random access memory (RAM) devices, which make up the system memory. An operating system provides the software that manages the hardware and software resources of the computer system, including the microprocessor and system memory. The operating system generally provides a user interface such that the resources may be accessed and controlled by a user.

When a computer is initially powered on, the system RAM is empty. To configure the computer system to facilitate the use of its resources, the operating system is loaded into the system RAM. The process of launching the operating system is generally referred to as the "system boot." Once the boot process is complete and the operating system is loaded into the system RAM, the operating system may be implemented to control and manage both hardware and software resources. However, before the system boot, the system RAM cannot be implemented to execute commands because the operating system has not been loaded into the system RAM. To provide boot instructions for loading the operating system, a basic input output system (BIOS) is generally provided. The BIOS is a firmware-resident program that initializes a computer system following power-on or reset operations. Various components of the computer system are initialized, one by one, after which the operating system is booted. The BIOS is stored on a firmware device, such as a read only memory (ROM) chip or a flash memory chip in the computer system.

Because each computer system may include different hardware components, the BIOS software is also configured to perform a power-on self-test (POST) to test the functionality of the different hardware components on the computer system. The POST generally refers to a diagnostic testing sequence executed by the BIOS software to determine whether the RAM, peripheral devices, such as disk drives, and any other hardware components are operating properly. Further, a number of peripheral component interconnect (PCI) devices may be coupled to the computer system through PCI plug-in expansion slots.

These PCI devices, such as, for example, expansion ROM, network devices, video, and audio chips, may be included on a PCI expansion plug-in card, which is configured to be coupled to the computer system through the PCI plug-in expansion slots. Each PCI device on a PCI plug-in expansion card has an associated expansion ROM, which contains microcode that enables the PCI device to function within the computer system. At system boot, the system BIOS configures the computer system in accordance with the current resources, including any PCI plug-in expansion cards that may be coupled into the computer system. Accordingly, the system BIOS also facilitates the activation of the additional microcode that resides in the expansion ROM on the plug-in expansion cards for each PCI device.

As can be appreciated, the more PCI devices coupled to the computer system through PCI slots, the longer the booting of the computer system may take. Consequently, booting such a computer system that includes a plurality of PCI devices may take several minutes. In certain applications, this timing penalty may be disadvantageous. In addition, including an expansion ROM for each PCI device on the PCI plug-in card increases production costs and decreases space on the PCI plug-in card.

Therefore, it would be advantageous to have an improved method, apparatus, and computer useable program code for caching PCI device expansion ROM microcode in BIOS memory.

SUMMARY OF THE INVENTION

The present invention provides a computer implemented method, apparatus, and computer usable program code for caching peripheral component interconnect device data. Peripheral component interconnect device data is discovered in response to probing a peripheral component interconnect device. The discovered peripheral component interconnect device data is cached. Then, the cached peripheral component interconnect device data is configured to enable the peripheral component interconnect device to execute.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
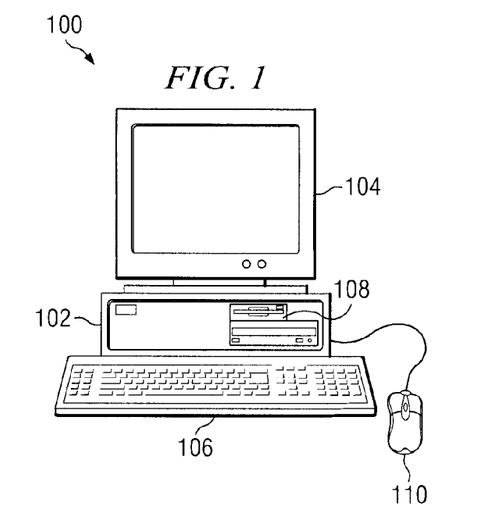
FIG. 1 is a pictorial representation of a data processing system in which aspects of the present invention may be implemented.

With reference now to the figures and in particular with reference to FIG. 1, a pictorial representation of a data processing system is shown in which the aspects of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
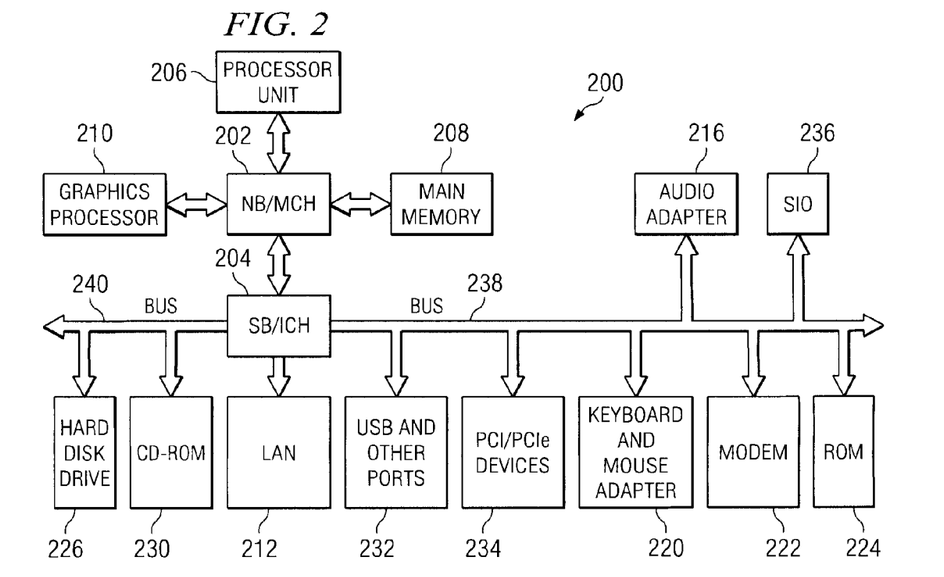
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide for a computer implemented method, apparatus, and computer usable program code for compiling source code. The methods of the present invention may be performed in a data processing system, such as data processing system 100 shown in FIG. 1 or data processing system 200 shown in FIG. 2.

Aspects of the present invention provide a computer implemented method, apparatus, and computer useable program code for caching PCI device expansion ROM or flash memory data. The PCI device expansion ROM or flash memory data is PCI device adapter microcode. The adapter microcode is used to enable matching PCI devices to execute. The system BIOS probes each PCI device on a PCI plug-in card to discover if an expansion ROM or flash memory is coupled to at least one of the PCI devices. After discovering the presence of a PCI device expansion ROM or flash memory that contains the adapter microcode, the system BIOS caches a copy of the discovered adapter microcode in BIOS memory. The system BIOS configures the cached copy or copies of adapter microcode to enable mathcing PCI devices, which may or may not have an expansion ROM or flash memory coupled to them, to execute.

Using aspects of the present invention, computer hardware designers may design PCI plug-in cards containing fewer expansion ROM or flash memory. By using fewer expansion ROM or flash memory on PCI plug-in cards, parts costs are reduced per PCI plug-in card and more space is available on each PCI plug-in card for other PCI devices. In addition, using aspects of the present invention may reduce computer system boot time because the system BIOS is not required to probe an increased number of expansion ROM or flash memory for necessary adapter microcode. Instead, aspects of the present invention cache copies of adapter microcode in BIOS memory for easier access. Further, aspects of the present invention place the coupled expansion ROM or flash memory containing the adapter microcode on the first probed PCI device to optimize computer system boot speed.

Figure 3:
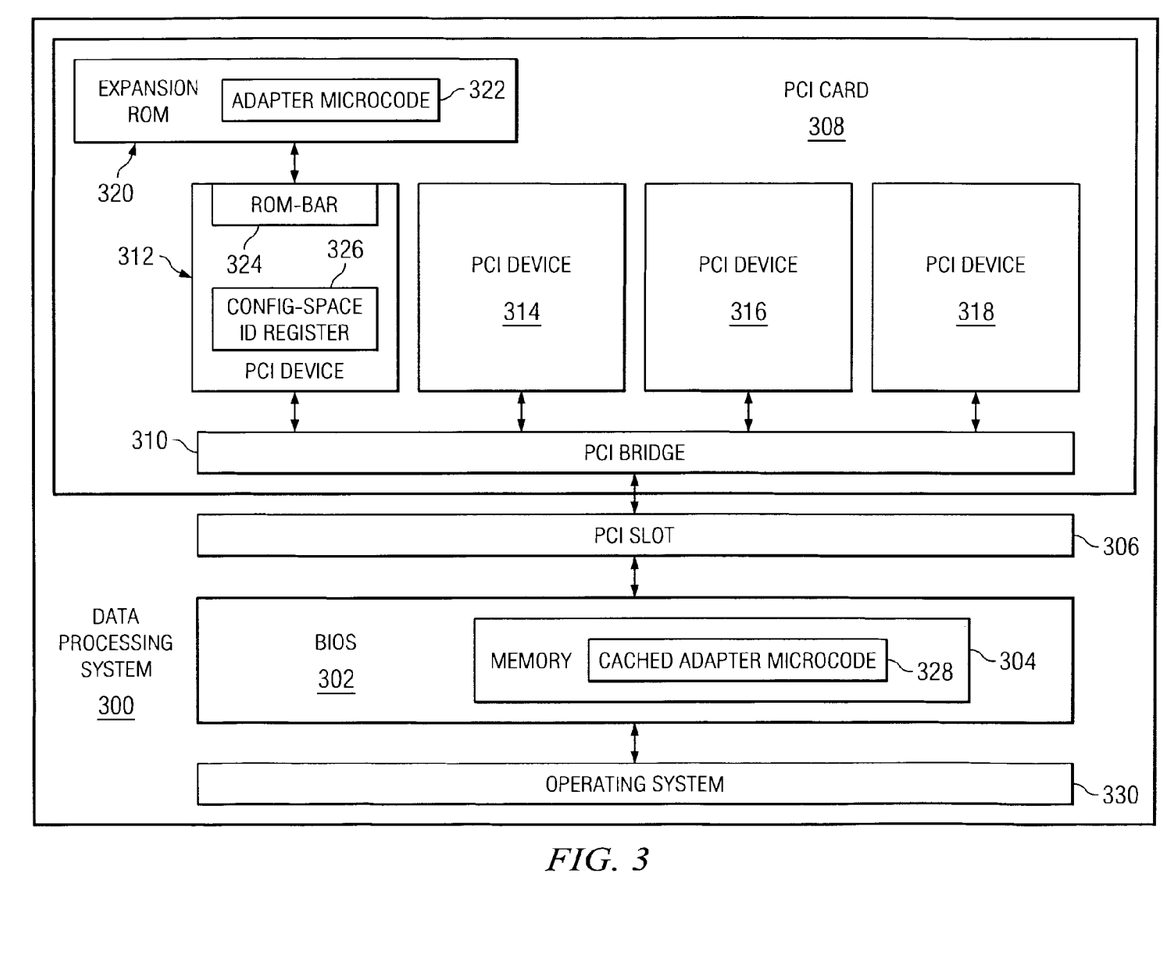
FIG. 3 is a block diagram of a data processing system that includes a peripheral component interconnect plug-in card with a plurality of peripheral component interconnect devices with one expansion read only memory chip that contains adapter microcode for the plurality of peripheral component interconnect devices in accordance with an embodiment of the present invention.

Referring now to FIG. 3, a block diagram of a data processing system that includes a peripheral component interconnect plug-in card with a plurality of peripheral component interconnect devices with one expansion read only memory chip that contains adapter microcode for the plurality of peripheral component interconnect devices is depicted in accordance with an embodiment of the present invention. Data processing system 300 may be, for example, data processing system 200 in FIG. 2. Data processing system 300 may include, for example, BIOS 302, PCI slot 306, and PCI plug-in card 308.

BIOS 302 may be, for example, ROM 224 in FIG. 2. BIOS 302 includes memory 304, which contains essential boot routines for data processing system 300. BIOS 302 also provides an interface between the operating system and hardware, such as PCI devices.

PCI plug-in card 308 plugs into PCI slot 306 to couple PCI plug-in card 308 to data processing system 300, which allows BIOS 302 to communicate with PCI card 308. BIOS 302 probes PCI plug-in card 308 during the booting process of data processing system 300 to discover all PCI chipsets, such as PCI devices, expansion ROM, flash memory, and the like.

PCI plug-in card 308 may include, for example, PCI bridge 310 and PCI devices 312, 314, 316, and 318, such as, PCI/PCIe devices 234 in FIG. 2. PCI bridge 310 couples PCI devices 312, 314, 316, and 318 to PCI slot 306, which is coupled to BIOS 302. It should be noted that even though PCI plug-in card 308 shows four PCI devices, such as PCI devices 312, 314, 316, and 318, embodiments of the present invention are not restricted to such. PCI plug-in card 308 may include more or fewer PCI devices as required by processes of embodiments of the present invention. Further, it should be noted that in this illustrative example, PCI devices 312, 314, 316, and 318 are the same type of PCI device. For example, PCI devices 312, 314, 316, and 318 may be PCI Ethernet chipsets to provide data processing system 300 with network communication capabilities. However, embodiments of the present invention are not limited to the use of only one type of PCI device on PCI plug-in card 308. Embodiments of the present invention may utilize a plurality of different types of PCI devices on PCI plug-in card 308.

PCI plug-in card 308 also may include expansion ROM 320, which includes adapter microcode 322. It should be noted that embodiments of the present invention are not restricted to the use of expansion ROM. Embodiments of the present invention may utilize other forms of expansion memory, such as, for example, flash memory.

Moreover, it should be noted that in this particular illustrative example, PCI plug-in card 308 only includes one expansion ROM for PCI devices 312, 314, 316, and 318. Embodiments of the present invention only require one expansion ROM, such as expansion ROM 320, for identical PCI devices, such as PCI devices 312, 314, 316, and 318 because embodiments of the present invention cache a copy of adapter microcode 322 in BIOS memory 304 for PCI devices 314, 316, and 318 that do not have an expansion ROM. The cached copy of adapter microcode 322 is used to enable PCI devices 314, 316, and 318 to execute.

Furthermore, coupling expansion ROM 320 to the first PCI device, such as PCI device 312 on PCI plug-in card 308, reduces boot time because BIOS 302 is not required to continue probing for adapter microcode 322 to enable PCI devices 312, 314, 316, and 318. However, embodiments of the present invention are not limited to coupling expansion ROM 320 to the first PCI device. Expansion ROM 320 may be coupled to any PCI device on PCI plug-in card 308, such as PCI device 314, 316, or 318.

In addition, embodiments of the present invention are not restricted to only one expansion ROM on PCI plug-in card 308. Embodiments of the present invention may use a plurality of expansion ROM on PCI plug-in card 308. Further, the plurality of expansion ROM may be of different types. For example, the plurality of expansion ROM chips may contain adapter microcode for each of a plurality of different types of PCI devices on PCI plug-in card 308. But, embodiments of the present invention may use only one expansion ROM for each set of different PCI devices within data processing system 300.

In addition, PCI device 312 may include read only memory base address register (ROM-BAR) 324. PCI device 312 uses ROM-BAR 324 to indicate whether an expansion ROM is coupled to PCI device 312. BIOS 302 probes ROM-BAR 324 to discover the presence or absence of an expansion ROM coupled to PCI device 312. In this particular illustrative example, ROM-BAR 324 indicates that expansion ROM 320 is coupled to PCI device 312.

Further, PCI device 312 also may include config-space identification register 326. Config-space identification register 326 specifically identifies what type of device PCI device 312 is. BIOS 302 probes config-space identification register 326 to determine if a match between PCI device 312 and adapter microcode 322 occurs. If a match is found between PCI device 312 and adapter microcode 322, then BIOS 302 configures adapter microcode 322 to enable PCI device 312 to execute.

Then, BIOS 302 probes the ROM-BARs of PCI devices 314, 316, and 318 to discover the presence or absence of an expansion ROM. In this particular illustrative example, the ROM-BARs of PCI devices 314, 316, and 318 indicate the absence of an expansion ROM. After determining PCI devices 314, 316, and 318 are not coupled to an expansion ROM, BIOS 302 compares the config-space identification registers of PCI devices 314, 316, and 318 with the header of cached adapter microcode 328 in memory 304. If a match is found between any of the config-space identification registers of PCI devices 314, 316, and/or 318 and the header of cached adapter microcode 328, BIOS 302 configures cached adapter microcode 328 to enable the matching PCI devices.

Subsequent to probing all chipsets on PCI plug-in card 308 and performing all other essential boot procedures, BIOS 302 loads operating system 330 into RAM, such as main memory 208 in FIG. 2. Finally, BIOS 302 passes control of data processing system 300 over to operating system 330.

Figure 4:
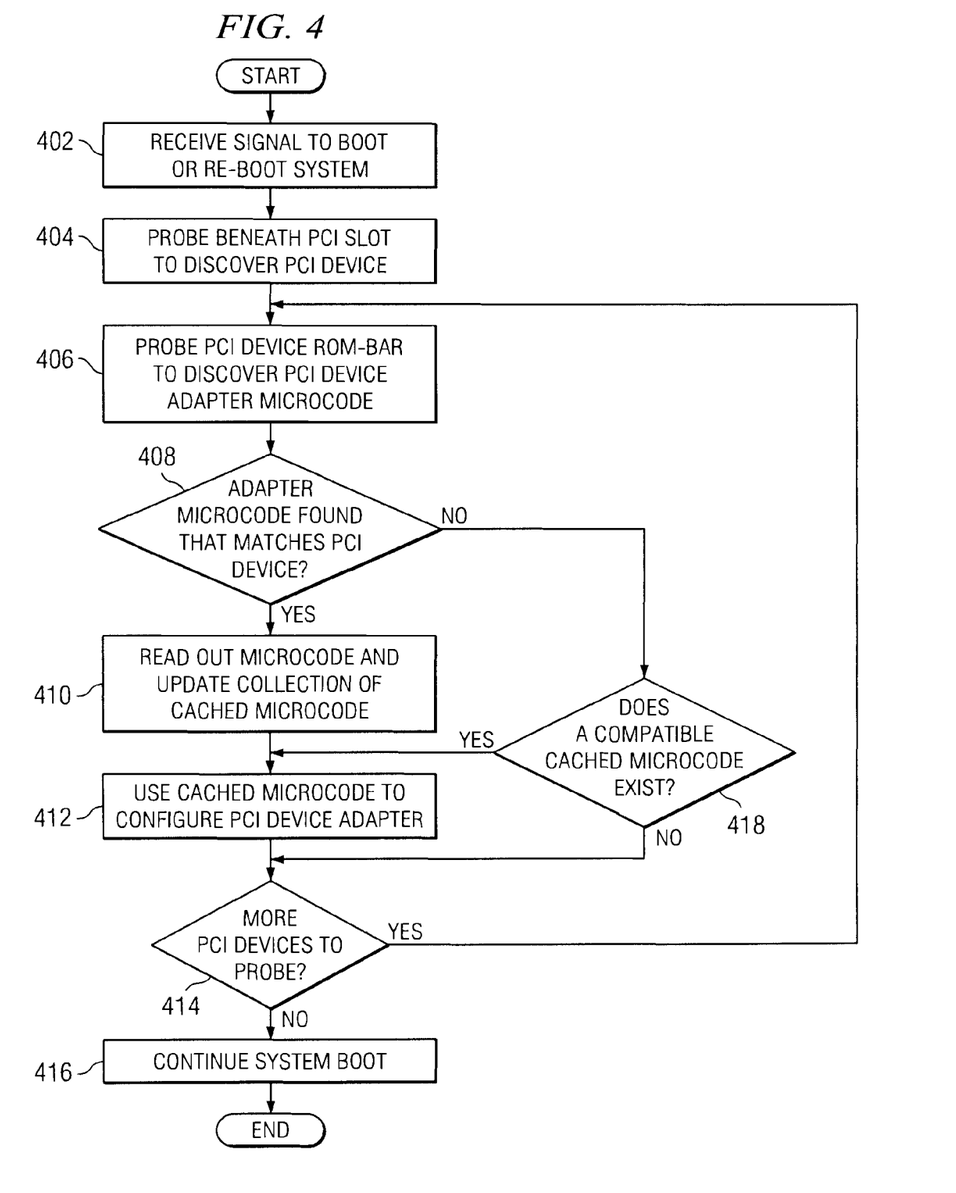
FIG. 4 is a flowchart illustrating an exemplary process for caching peripheral component interconnect device expansion read only memory adapter microcode in basic input output system memory in accordance with an embodiment of the present invention.

Turning now to FIG. 4, a flowchart illustrating an exemplary process for caching peripheral component interconnect device expansion read only memory adapter microcode in basic input output system memory is shown in accordance with an embodiment of the present invention. The process depicted in FIG. 4 may be implemented in a data processing system BIOS, such as, for example, BIOS 302 within data processing system 300 in FIG. 3.

The process begins when the BIOS receives a signal to boot or re-boot the data processing system (step 402). After receiving the signal to boot or re-boot the data processing system in step 402, the BIOS probes beneath a PCI slot, such as PCI slot 306 in FIG. 3, to discover a PCI device, such as PCI device 312 in FIG. 3 (step 404). Upon discovering the PCI device in step 404, the BIOS probes the PCI device ROM-BAR, such as ROM-BAR 324 in FIG. 3, to discover if an expansion ROM, such as expansion ROM 320 in FIG. 3, is coupled to the PCI device (step 406). The expansion ROM contains the adapter microcode, such as adapter microcode 322 in FIG. 3, for the PCI device.

Then, the BIOS makes a determination as to whether adapter microcode was found that matches the PCI device (step 408). The BIOS compares the found adapter microcode header with the PCI device config-space identification register, such as config-space identification register 326 in FIG. 3, for a match. If the BIOS does find adapter microcode that matches the PCI device, yes output of step 408, then the BIOS reads out the adapter microcode and updates a collection of cached microcode, such as cached adapter microcode 328 in FIG. 3, by caching a copy of the found adapter microcode in BIOS memory, such as BIOS memory 304 in FIG. 3 (step 410).

Subsequent to caching a copy of the found adapter microcode in step 410, the BIOS uses the cached copy of the microcode to configure the PCI device adapter in order for the PCI device to execute (step 412). After configuring the PCI device adapter in step 412, the BIOS makes a determination as to whether more PCI devices on the PCI plug-in card, such as PCI plug-in card 308 in FIG. 3, need to be probed (step 414). If more PCI devices need to be probed, yes output of step 414, then the process returns to step 406 where the BIOS probes the next PCI device ROM-BAR to discover if PCI device adapter microcode is present. If no more PCI devices need to be probed, no output of step 414, then the BIOS continues system boot procedures (step 416) and the process terminates thereafter.

Returning now to step 408, if the BIOS does not find adapter microcode that matches the PCI device, no output of step 408, then the BIOS makes a determination as to whether a compatible adapter microcode exists in the collection of cached microcode in BIOS memory (step 418). If a compatible cached microcode exists in BIOS memory, then the process returns to step 412 where the BIOS uses the cached microcode to configure the PCI device adapter. If a compatible cached microcode does not exist in BIOS memory, then the process returns to step 414 where the BIOS makes a determination as to whether more PCI devices need to be probed.

Figure 5A:
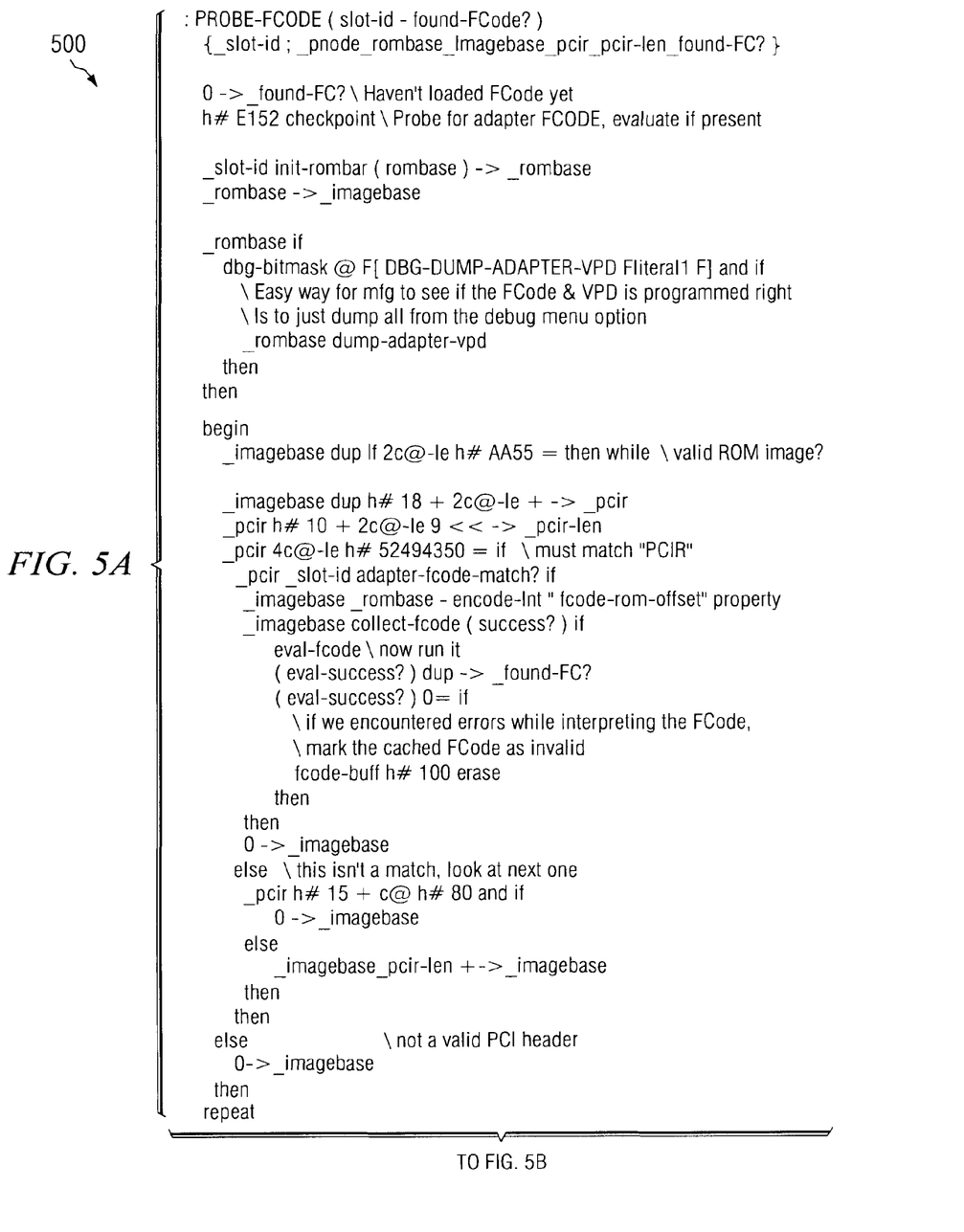
FIGS. 5A and 5B are an exemplary microcode for caching peripheral component interconnect device expansion read only memory adapter microcode in a basic input output system in accordance with an embodiment of the present invention.
Figure 5B:
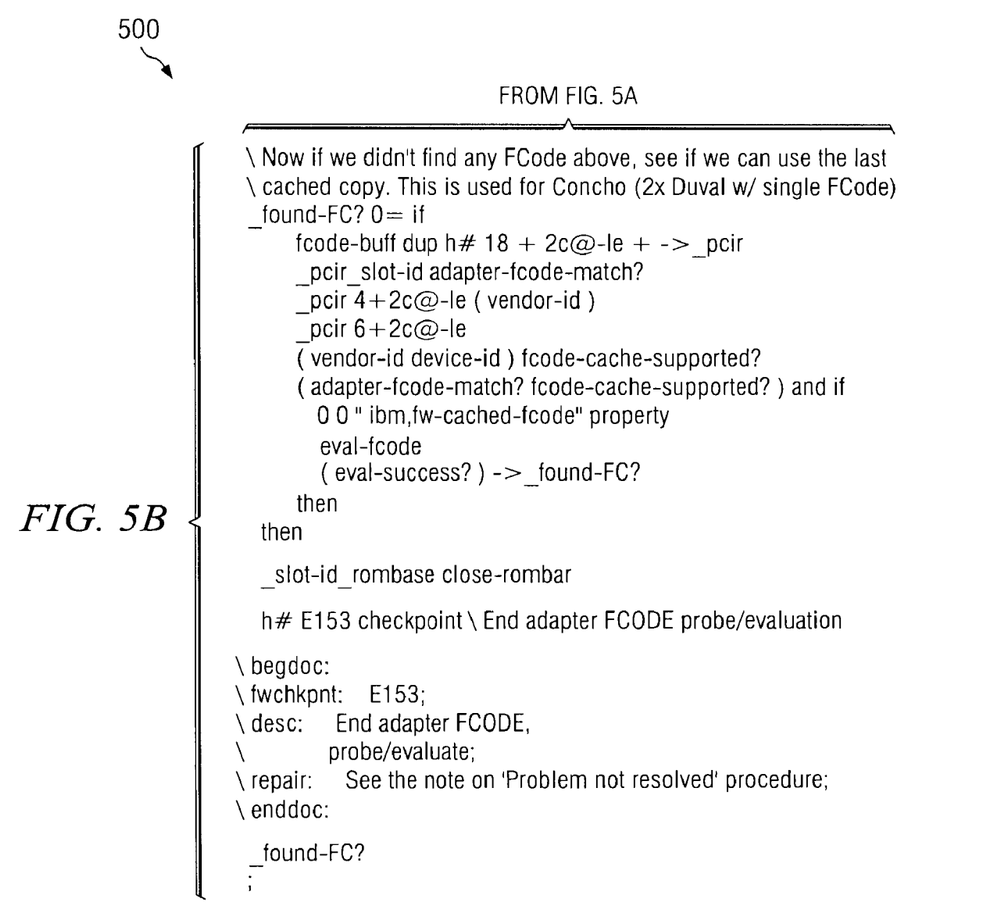

With reference now to FIGS. 5A and 5B, an exemplary source code for caching peripheral component interconnect device expansion read only memory adapter microcode in a basic input output system is shown in accordance with an embodiment of the present invention. The source code for caching PCI device expansion ROM adapter microcode, such as adapter microcode 322 in FIG. 3, resides in the BIOS, such as BIOS 302 in FIG. 3. Source code 500 is only presented as an example of BIOS source code that may be utilized by embodiments of the present invention to cache PCI device expansion ROM within the BIOS. However, embodiments of the present invention are not restricted to the use of source code 500. Embodiments of the present invention may utilize any BIOS source code that is capable of caching PCI device expansion ROM within BIOS.

Thus, embodiments of the present invention provide a computer implemented method, apparatus, and computer usable program code for caching PCI device expansion ROM data within the system BIOS. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for caching peripheral component interconnect device data, the computer implemented method comprising:

responsive to probing a first peripheral component interconnect device within a plurality of different peripheral component interconnect devices included on a peripheral component interconnect card, discovering peripheral component interconnect device data that resides in a peripheral component interconnect expansion memory connected only to the first peripheral component interconnect device, wherein only the first peripheral component interconnect device within the plurality of different peripheral component interconnect devices includes a peripheral component interconnect expansion memory, and wherein the peripheral component interconnect data within the peripheral component interconnect expansion memory includes a plurality of different microcodes used to enable matching peripheral component interconnect devices within the plurality of different peripheral component interconnect devices to execute;

caching the peripheral component interconnect device data to form cached peripheral component interconnect device data; and configuring the cached peripheral component interconnect device data to enable the plurality of different peripheral component interconnect devices included on the peripheral component interconnect card to execute.

2. The computer implemented method of claim 1, wherein the peripheral component interconnect device data is an adapter microcode.

3. The computer implemented method of claim 2, wherein the adapter microcode is cached within a basic input output system memory.

4. The computer implemented method of claim 1, wherein the peripheral component interconnect expansion memory is at least one of an expansion read only memory or a flash memory.

5. A data processing system for caching peripheral component interconnect device data, comprising:

a bus system;

a storage device connected to the bus system, wherein the storage device includes a set of instructions; and a processing unit connected to the bus system, wherein the processing unit executes the set of instructions to discover peripheral component interconnect device data that resides in a peripheral component interconnect expansion memory connected only to a first peripheral component interconnect device within a plurality of different peripheral component interconnect devices included on a peripheral component interconnect card in response to probing the first peripheral component interconnect device, wherein only the first peripheral component interconnect device within the plurality of different peripheral component interconnect devices includes a peripheral component interconnect expansion memory, and wherein the peripheral component interconnect data within the peripheral component interconnect expansion memory includes a plurality of different microcodes used to enable matching peripheral component interconnect devices within the plurality of different peripheral component interconnect devices to execute: cache the peripheral component interconnect device data to form cached peripheral component interconnect device data; and configure the cached peripheral component interconnect device data to enable the plurality of different peripheral component interconnect devices included on the peripheral component interconnect card to execute.

6. The data processing system of claim 5, wherein the peripheral component interconnect expansion memory is at least one of an expansion read only memory or a flash memory.

7. A computer program product stored in a tangible computer usable medium having computer usable program code tangibly embodied therein for caching peripheral component interconnect device data, the computer program product comprising:

computer usable program code configured to discover peripheral component interconnect device data that resides in a peripheral component interconnect expansion memory connected only to a first peripheral component interconnect device within a plurality of different peripheral component interconnect devices included on a peripheral component interconnect card in response to probing the first peripheral component interconnect device, wherein only the first peripheral component interconnect device within the plurality of different peripheral component interconnect devices includes a peripheral component interconnect expansion memory, and wherein the peripheral component interconnect data within the peripheral component interconnect expansion memory includes a plurality of different microcodes used to enable matching peripheral component interconnect devices within the plurality of different peripheral component interconnect devices to execute;

computer usable program code configured to cache the peripheral component interconnect device data to form cached peripheral component interconnect device data; and computer usable program code configured to configure the cached peripheral component interconnect device data to enable the plurality of different peripheral component interconnect devices included on the peripheral component interconnect card to execute.

8. The computer program product of claim 7, wherein the peripheral component interconnect device data is an adapter microcode.

9. The computer program product of claim 8, wherein the adapter microcode is cached within a basic input output system memory.

* * * * *